United States Patent
Kuroe et al.

(10) Patent No.: US 11,002,330 B2
(45) Date of Patent: May 11, 2021

(54) THERMOSETTING RESIN COMPOSITION FOR FRICTION MATERIAL, FRICTION MATERIAL AND METHOD FOR PRODUCING THERMOSETTING RESIN COMPOSITION FOR FRICTION MATERIAL

(71) Applicant: AKEBONO BRAKE INDUSTRY CO., LTD., Tokyo (JP)

(72) Inventors: Motoki Kuroe, Tokyo (JP); Kanami Nakamura, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 95 days.

(21) Appl. No.: 15/888,184

(22) Filed: Feb. 5, 2018

(65) Prior Publication Data

US 2018/0231086 A1 Aug. 16, 2018

(30) Foreign Application Priority Data

Feb. 13, 2017 (JP) .............................. JP2017-023967

(51) Int. Cl.
| | |
|---|---|
| *F16D 69/02* | (2006.01) |
| *C08L 61/06* | (2006.01) |
| *B27N 3/28* | (2006.01) |
| *B27N 3/00* | (2006.01) |
| *C08L 97/02* | (2006.01) |
| *B27N 1/02* | (2006.01) |
| *C08L 79/02* | (2006.01) |
| *B27N 3/04* | (2006.01) |

(52) U.S. Cl.
CPC ........... *F16D 69/026* (2013.01); *B27N 3/002* (2013.01); *B27N 3/28* (2013.01); *C08L 61/06* (2013.01); *C08L 97/02* (2013.01); *B27N 1/02* (2013.01); *B27N 3/04* (2013.01); *C08L 79/02* (2013.01); *C08L 2205/16* (2013.01); *F16D 2200/0069* (2013.01); *F16D 2200/0095* (2013.01)

(58) Field of Classification Search
CPC . B27N 3/002; B27N 1/02; B27N 3/04; B27N 3/28; F16D 69/026; F16D 2200/0069; F16D 2200/0095; C08L 61/06; C08L 97/02; C08L 2205/16; C08L 79/02
USPC ........................................................ 523/156
See application file for complete search history.

(56) References Cited

U.S. PATENT DOCUMENTS

| | | | | |
|---|---|---|---|---|
| 5,422,170 A | * | 6/1995 | Iwata ..................... | B27N 3/005 428/218 |
| 2009/0054552 A1 | * | 2/2009 | Yano ........................ | C08J 5/06 523/200 |
| 2013/0005866 A1 | | 1/2013 | Yano et al. | |
| 2013/0253177 A1 | | 9/2013 | Kuroe | |
| 2016/0053182 A1 | * | 2/2016 | Ericsson ................... | C10B 7/00 201/20 |
| 2016/0208153 A1 | | 7/2016 | Hede et al. | |
| 2018/0038436 A1 | | 2/2018 | Kuroe | |

FOREIGN PATENT DOCUMENTS

| | | |
|---|---|---|
| CN | A-1554530 | 12/2004 |
| CN | A-101597476 | 12/2009 |
| EP | A1-2548917 | 1/2013 |
| EP | A2-3279268 | 2/2018 |
| JP | A-2004-325978 | 11/2004 |
| JP | 2006-152052 A | 6/2006 |
| JP | 2008-248092 A | 10/2008 |
| JP | 2008-248093 A | 10/2008 |
| JP | A-2013-199561 | 10/2013 |
| JP | A-2014-216376 | 11/2014 |
| JP | T-2016-536428 | 11/2016 |
| WO | WO-A1-2011-115154 | 9/2011 |

OTHER PUBLICATIONS

Extended European Search Report dated Jun. 29, 2018 in corresponding European patent application No. 18155696.0 (11 pages).
Nakagaito A. N. et al., "Novel high-strength biocomposites based on microfibrillated cellulose having nano-order-unit web-like network structure", Applied Physics A Materials Science & Processing, Springer Berlin Heidelberg, Berlin/Heidelberg, vol. 80, No. 1, Jan. 1, 2005, pp. 155-159.
Xin et al., "Friction properties of sisal fibre reinforced resin brake composites", Jan. 26, 2007, vol. 262, No. 5-6, Jan. 26, 2007, pp. 736-741.
CN Office Action dated Mar. 11, 2020 in Chinese Application No. 201810150062.9 (with attached English-language translation).
JP Office Action dated Oct. 13, 2020 from corresponding Japanese patent application No. 2017-023967 (with attached English-language translation).

* cited by examiner

*Primary Examiner* — Angela C Scott
(74) *Attorney, Agent, or Firm* — Faegre Drinker Biddle & Reath LLP

(57) ABSTRACT

A thermosetting resin composition for a friction material includes a thermosetting resin and a lignocellulose nanofiber dispersed in the thermosetting resin. A method for producing a thermosetting resin composition for a friction material includes a first step and a second step. In the first step, a plant-based biomass containing a lignocellulose is mixed with a dispersion medium to obtain a mixture thereof, and the mixture is subjected to a defibration treatment to obtain a slurry of a lignocellulose nanofiber. In the second step, phenol is reacted with an aldehyde in the presence of an acid catalyst to obtain a thermosetting resin, and the slurry is added to the thermosetting resin. The lignocellulose nanofiber is dispersed in the thermosetting resin while removing the dispersion medium and unreacted phenol.

22 Claims, No Drawings

THERMOSETTING RESIN COMPOSITION FOR FRICTION MATERIAL, FRICTION MATERIAL AND METHOD FOR PRODUCING THERMOSETTING RESIN COMPOSITION FOR FRICTION MATERIAL

CROSS-REFERENCE TO RELATED APPLICATIONS

This application claims priority from Japanese Patent Application No. 2017-023967 filed on Feb. 13, 2017, the entire subject matter of which is incorporated herein by reference.

BACKGROUND OF THE INVENTION

Technical Field

The present invention relates to: a thermosetting resin composition for a friction material to be used for brake pads, brake linings, clutch facings or the like in industrial machines, railway vehicles, freight cars, passenger cars and the like; a friction material using the thermosetting resin composition; and a method for producing the thermosetting resin composition for a friction material.

Background Art

Thermosetting resins are used as a binder of a friction material, and of those, a phenol-based thermosetting resin has excellent heat resistance, dimensional stability, mechanical strength and the like, and is therefore widely used. In recent years, thermal loads and mechanical loads to a friction material are increasing, and a thermosetting resin capable of enhancing heat resistance and strength is required in thermosetting resins to be used as a binder. To respond to those requirements, various technologies have been proposed for modifying (denaturing) a thermosetting resin and improving desired properties.

For example, Patent Document 1 describes that a thermosetting resin composition containing a triazine-modified resol-type phenol resin obtained by reacting (a) phenol monomers, (b) triazines, (c) aldehydes and (d) novolac-type phenol resins is excellent in heat resistance and flexibility.

On the other hand, a problem of global warming due to the increase of carbon dioxide concentration in the atmosphere has recently been becoming a global problem, and techniques for reducing carbon dioxide emissions have been developed in various industrial fields. From the background, reuse of woody wastes such as barks, thinnings and building wastes is considered, and various resin compositions using the plant-derived material (plant-based biomass) are proposed.

For example, Patent Document 2 describes a phenol resin composite material obtained by impregnating a fiber base material with a liquid mixture including a microfibers and a phenol resin prepolymer, and laminating and molding the impregnated product.

Patent Document 3 describes a method for producing a phenol resin composition including directly melt kneading a mixture including cellulose nanofibers and water as main components, with a phenol resin.

Patent Document 1: JP-A-2006-152052
Patent Document 2: JP-A-2008-248092
Patent Document 3: JP-A-2008-248093

SUMMARY OF THE INVENTION

In the field of friction materials, consideration is required to wear debris generated from the friction materials and environmental load caused by the discarded friction materials from the standpoint of environmental preservation, and it is considered to use a resin composition using the plant-based biomass, as a binder.

However, the resin composition containing the plant-based biomass does not have sufficient strength as a reinforcing material, and is therefore not suitable for use as a resin composition for a friction material.

In the phenol resin composite material described in Patent Document 2, it is necessary to impregnate a fiber base material with a liquid mixture including microfibers and a phenol resin prepolymer, and in the phenol resin composition described in Patent Document 3, it is necessary to directly melt kneading a mixture including cellulose nanofibers and water as main components, with a phenol resin.

In view of the above, an object in an aspect of the present invention is to provide a thermosetting resin composition for a friction material, modified by a plant-based biomass, more specifically a thermosetting resin composition capable of giving sufficient bending strength and abrasion resistance to a friction material, and a friction material containing the thermosetting resin composition.

Another object in an aspect of the present invention is to provide a method for producing a thermosetting resin composition for a friction material, not requiring a dispersion treatment such as melt kneading for dispersing a plant-based biomass in a thermosetting resin.

As a result of various investigations, the present inventors have found that a thermosetting resin composition for a friction material, including a thermosetting resin and lignocellulose nanofibers dispersed therein gives sufficient bending strength and abrasion resistance to the friction material, and a dispersion treatment such as melt kneading the lignocellulose nanofibers with the thermosetting resin in the production process is not required, and thus, the present invention has been completed.

The present invention relates to the followings.

<1> A thermosetting resin composition for a friction material, comprising a thermosetting resin and a lignocellulose nanofiber dispersed in the thermosetting resin.

<2> The thermosetting resin composition according to <1>, wherein a content of the lignocellulose nanofiber is 0.1 to 20% by mass.

<3> The thermosetting resin composition according to <1> or <2>, wherein the lignocellulose nanofibers has an average fiber diameter of 1 to 500 nm.

<4> The thermosetting resin composition according to any one of <1> to <3>, wherein the thermosetting resin is a phenol resin.

<5> A friction material comprising the thermosetting resin composition according to any one of <1> to <4>.

<6> The friction material according to <5>, wherein a content of the thermosetting resin composition is 5 to 15% by mass.

<7> A method for producing a thermosetting resin composition for a friction material, comprising:

mixing a plant-based biomass containing a lignocellulose with a dispersion medium to obtain a mixture thereof, and subjecting the mixture to a defibration treatment, thereby obtaining a slurry of a lignocellulose nanofiber; and reacting phenol with an aldehyde in the presence of an acid catalyst to obtain a thermosetting resin, adding the slurry to the thermosetting resin, and dispersing the lignocellulose nanofiber in the thermosetting resin while removing the dispersion medium and unreacted phenol.

Lignocellulose nanofibers modify a thermosetting resin and function as a reinforcing material. Therefore, the thermosetting resin composition for a friction material including a thermosetting resin and lignocellulose nanofibers dispersed therein can give sufficient bending strength and abrasion resistance to the friction material. As a result, the present invention can provide a friction material having excellent bending strength and abrasion resistance.

The present invention can further provide a method for producing a thermosetting resin composition for a friction material, not requiring a dispersion treatment such as melt kneading for dispersing a plant-based biomass containing lignocellulose in a thermosetting resin.

DETAILED DESCRIPTION OF THE INVENTION

Embodiments of the present invention are described in detail below, but those merely exemplify an example of desirable embodiments, and the present invention is not construed as being limited to those.

(Thermosetting Resin Composition)

The thermosetting resin composition includes a thermosetting resin and a lignocellulose nanofiber dispersed in the thermosetting resin.

(Lignocellulose Nanofibers)

Lignocellulose nanofibers (hereinafter referred to as "LCNF") can be obtained by mixing a plant-based biomass containing lignocellulose with a dispersion medium at 0 to 80° C. and subjecting the resulting mixture to a defibration treatment for 1 to 12 hours.

Examples of the plant-based biomass containing lignocellulose include woody materials such as chips or barks of paper-making trees, forest scraps and thinned woods, sawdust generated from sawmills and the like, pruned branches and leaves in tree-lined street, and building wastes; vegetation-based materials such as kenaf, rice straws, com-cob and bagasse; and bacteria celluloses yielded from microorganisms.

Specific examples of the woody materials include needle-leaved trees such as cedar, fir, cypress and pine, and broad-leaved trees such as poplar, eucalyptus, acacia, birk, beech, oak and willow. Of those, cedar and cypress that are easily available are preferably used.

Those plant-based biomasses may be used alone or as mixtures thereof.

Lignocellulose is a component of a plant cell wall, and has a three-dimensional network layered structure in which cellulose is strongly bonded to lignin and hemicellulose. The cellulose forms microfibrils (cellulose nanofibers) having crystallinity in which single molecules are regularly aggregated and several tens thereof are gathered. The lignocellulose contains cellulose in an amount of 45 to 50% by mass, hemicellulose in an amount of 15 to 30% by mass and lignin in an amount of 25 to 35% by mass.

Examples of the dispersion medium include water, and hydrophilic organic solvents such as alcohols (methanol, ethanol, isopropanol, sec-butanol, tert-butanol, ethylene glycol, glycerin and the like), ethers (ethylene glycol dimethyl ether, 1,4-dioxane, tetrahydrofuran and the like), ketones (acetone, methyl ethyl ketone, N,N-dimethylformamide, N,N-dimethylacetamide, dimethylsulfoxide and the like) and the like. Of those, water is preferably used from the standpoints of easy removal and safety of the dispersion medium.

Those dispersion media may be used alone or as mixtures thereof.

The content of the LCNF in the thermosetting resin composition is preferably 0.1 to 20% by mass, more preferably 0.5 to 15% by mass, and still more preferably 1 to 10% by mass.

When the content of the LCNF in the thermosetting resin composition is 0.1% by mass or more, bending strength of a friction material using the thermosetting resin composition can be improved as compared with that of a friction material using a thermosetting resin as a base resin.

On the other hand, when the content of the LCNF in the thermosetting resin composition exceeds 20% by mass, strength and bending modulus of the friction material using the thermosetting resin composition may be deteriorated.

The average fiber diameter of the LCNF is preferably 1 to 500 nm, more preferably 1 to 300 nm, and still more preferably 1 to 200 nm.

In the case where the average fiber diameter of the LCNF is less than 1 nm, the production would be substantially difficult.

On the other hand, in the case where the average fiber diameter of the LCNF exceeds 500 nm, dispersibility in the thermosetting resin composition may be deteriorated, resulting in deterioration of reinforcing effect.

The average fiber diameter of the LCNF is a value obtained by observing LCNF with a scanning electron microscope (SEM) or the like, randomly extracting 10 fibers, measuring diameters of those fibers, and averaging those diameters.

(Thermosetting Resin)

Examples of the thermosetting resin include a phenol resin, a melamine resin, an epoxy resin, a benzoxazine resin, a polyimide resin and the like. Those thermosetting resins can be used alone or as mixtures thereof.

Of those resins, a phenol resin has many hydroxyl groups, and therefore has high affinity with LCNF having high hydrophilicity. For this reason, a phenol resin is preferably used.

Examples of the phenol resin include a straight phenol resin, and various modified phenol resins modified by an elastomer or the like. Examples of the elastomer-modified phenol resin include an acryl rubber-modified phenol resin, a silicone rubber-modified phenol resin, a nitrile rubber-modified phenol resin and the like.

(Method for Producing Thermosetting Resin Composition)

A method for producing a thermosetting resin composition for a friction material in an aspect of the present invention is described below.

The production method includes mixing a plant-based biomass containing a lignocellulose with a dispersion medium to obtain a mixture thereof, and subjecting the mixture to a defibration treatment, thereby obtaining a slurry of a lignocellulose nanofiber (first step), and reacting phenol with an aldehyde in the presence of an acid catalyst to obtain a thermosetting resin, adding the slurry to the thermosetting resin, and dispersing the lignocellulose nanofiber in the thermosetting resin while removing the dispersion medium and unreacted phenol (second step).

(First Step)

In the method for producing a thermosetting resin composition for a friction material, a plant-based biomass containing lignocellulose is mixed with a dispersion medium, and the resulting mixture is subjected to a defibration treatment, thereby obtaining a slurry of LCNF.

The above-described plant-based biomass containing lignocellulose and the above-described dispersion medium can be used as the plant-based biomass containing lignocellulose and the dispersion medium, which are used in the method, respectively.

The amount of the dispersion medium used is preferably 100 to 5,000 parts by mass, more preferably 300 to 3,000 parts by mass, and still more preferably 500 to 2,000 parts by mass, per 100 parts by mass of the plant-based biomass from the standpoint of optimization of a viscosity of LCNL slurry.

The defibration treatment can be conducted by mechanical pulverization or beating using a homogenizer, a grinder, a cut mill, a ball mill, a rod mill, a bead mill, a disc mill, a hammer mill, a jet mill, an extruder, a mixer or the like.

The solid content concentration of the LCNF slurry obtained is preferably 0.1 to 10% by mass, more preferably 0.5 to 7% by mass, and still more preferably 1 to 5% by mass, from the standpoint of uniform dispersion in a dispersion medium.

The LCNF slurry can be obtained in the first step.
(Second Step)

Phenol is reacted with an aldehyde in the presence of an acid catalyst to obtain a thermosetting resin, the slurry is added to the resulting thermosetting resin, and LCNF is dispersed in the thermosetting resin while removing the dispersion medium and unreacted phenol.

In the second step, phenol is reacted with an aldehyde in the presence of an acid catalyst by refluxing under heating at 70 to 110° C. for 1 to 12 hours, thereby obtaining a reaction product (i.e. thermosetting resin).

In the case where the temperature of the reflux under heating falls within the above range, polymerization sufficiently proceeds, and this is preferred.

Furthermore, in the case where the time of the reflux under heating falls within the above range, polymerization sufficiently proceeds, and this is preferred.

Examples of the aldehyde include formaldehyde, glyoxal, acetaldehyde, chroral, furfural, benzaldehyde and the like. Of those aldehydes, formaldehyde is preferably used.

Those aldehydes may be used alone or as mixtures thereof.

The amount of the aldehyde used is preferably 10 to 30 parts by mass per 100 parts by mass of the phenol.

In the case where the amount of the aldehyde used is 10 parts by mass or more, monomers of phenols can be suppressed from remaining. In the case where the amount of the aldehyde used exceeds 30 parts by mass, the degree of polymerization of a resin composition may be excessively high.

Examples of the acid as a catalyst include an organic acid such as oxalic acid, formic acid, acetic acid and p-toluenesulfonic acid; an inorganic acid such as hydrochloric acid, sulfuric acid, nitric acid and phosphoric acid; and the like.

Of those acids, oxalic acid is preferably used from the standpoint that a neutralization treatment is unnecessary.

The amount of the acid used is preferably 0.1 to 10 parts by mass per 100 parts by mass of the phenol. In the case where the amount of the acid used falls within the above range, a reaction can sufficiently proceed.

The reaction product obtained by the reflux under heating is cooled to room temperature, the slurry of the LCNF obtained is added to the reaction product, and a dispersion medium and unreacted phenol are removed while rising a temperature to 120 to 200° C. Then, a thermosetting resin composition having LCNF dispersed therein can be obtained.

Examples of a method of removing the dispersion medium and unreacted phenol include vacuum distillation, atmospheric distillation, steam distillation and the like. Of those, the removal by the vacuum distillation is preferably used from the standpoint of removal efficiency of unreacted phenol.

In the method for producing a thermosetting resin composition for a friction material, a dispersion medium and unreacted phenol are removed during the second step. As a result, deterioration of heat resistance due to the presence of a phenol-aldehyde polycondensate in a thermosetting resin composition is suppressed. Furthermore, environmental loads can be reduced by using the thermosetting resin composition as a binder of a friction material.

In addition, in the second step, the lignocellulose nanofiber can be dispersed in the thermosetting resin without conducting a specific dispersion treatment such as melt kneading.
(Friction Material)

The thermosetting resin composition can be suitably used as a binder of a friction material. The friction material is described below.

The friction material includes a fiber base material, a friction modifier and a binder, and the thermosetting resin composition is contained in the friction material as the binder. As necessary, other materials can be further contained in the friction material.

The friction material can be suitably used as a friction material of a brake pad, brake lining or the like in automobiles and the like.
(Fiber Base Material)

The fiber base material is used for reinforcing a friction material. Examples of the fiber base material include organic fibers, inorganic fibers, metal fibers and the like.

Examples of the organic fibers include aromatic polyamide (aramid) fibers, flame-retardant acrylic fibers, cellulose fibers and the like. Examples of the inorganic fibers include biosoluble fibers, glass fibers, carbon fibers and the like. Examples of the metal fibers include steel fibers, aluminum fibers, zinc fibers, tin or tin alloy fibers, stainless steel fibers, copper or copper alloy fibers and the like. The fiber base material can be used alone or as mixtures of those.

Of those fiber base materials, aramid fibers are preferably used alone or in combination with other fiber base material(s).

Biosoluble fibers can be preferably used as the other fiber base material from the standpoint of less influence to a human body. Examples of the biosoluble fibers include biosoluble ceramic fibers such as $SiO_2$—CaO—MgO fibers, $SiO_2$—CaO—MgO—$Al_2O_3$ fibers and $SiO_2$—MgO—SrO fibers, and biosoluble rock wools.

The content of the fiber base material is preferably 1 to 20% by mass, and more preferably 3 to 15% by mass, based on the entire friction material in order to ensure sufficient mechanical strength.
(Friction Modifier)

A friction modifier is used to give desired friction properties such as abrasion resistance, heat resistance and fade resistance to the friction material.

Examples of the friction modifier include inorganic fillers such as alumina, barium sulfate, calcium carbonate, calcium hydroxide, vermiculite, mica, potassium titanate, lithium potassium titanate and magnesium potassium titanate (and preferable examples of the inorganic fillers include barium sulfate, calcium hydroxide, mica and potassium titanate); abrasives such as silica, magnesia, zirconia, zirconium silicate, chromium oxide and tri-iron tetraoxide ($Fe_3O_4$) (and preferable examples of abrasives include zirconium silicate); metal powders such as aluminum, zinc and tin; various rubber powders (rubber dust, tire powder and the like); organic fillers such as cashew dust and melamine dust (and preferable examples of organic fillers include cashew dust); solid lubricants such as graphite, molybdenum disulfide, tin sulfide and polytetrafluoroethylene (PTFE) (and preferable examples of lubricants include graphite); and the like.

Those friction modifiers can be used alone or as mixtures of those.

The content of the friction modifier is appropriately adjusted depending on desired friction properties. The content is preferably 60 to 90% by mass, and more preferably 70 to 90% by mass, based on the entire friction material.

(Binder)

The binder is used to integrate the fiber base material with the friction modifier. In the friction material, the thermosetting resin composition can be suitably used as a binder.

The content of the thermosetting resin composition is preferably 5 to 15% by mass, and more preferably 7 to 13% by mass, based on the entire friction material in order to ensure sufficient mechanical strength and abrasion resistance.

The friction material may contain at least one resin that can be generally used as a binder for a friction material, as other binder.

Examples of the other binder include thermosetting resins such as a straight phenol resin, various modified resin modified by an elastomer or the like, a melamine resin, an epoxy resin and a polyimide resin.

Examples of the elastomer-modified phenol resin include an acryl rubber-modified phenol resin, a silicone rubber-modified phenol resin, an NBR-modified phenol resin and the like.

(Production of Friction Material)

The friction material can be produced by conventional production steps. For example, the friction material can be produced through steps of subjecting the friction material composition to preforming, thermoforming, heating, grinding and the like.

General steps in the production of a brake pad for a disc brake are described below.

(a) Step of forming a steel plate (pressure plate) into a predetermined shape by sheet metal press.

(b) Step of subjecting the pressure plate to a degreasing treatment, chemical conversion treatment and a primer treatment and then applying an adhesive to the treated pressure plate.

(c) Step of blending powder raw materials of a fiber base material, a friction modifier, a binder and the like, mixing the resulting mixture to obtain a sufficiently homogenized friction material composition, and forming the composition at room temperature under a given pressure to prepare a pre-formed body.

(d) Thermally forming step of integrally fixing the pre-formed body to the pressure plate having applied thereto an adhesive at a predetermined temperature under a predetermined pressure (forming temperature: 130 to 180° C., forming pressure: 30 to 80 MPa and forming time: 2 to 10 minutes).

(e) Step of conducting after-curing (150 to 300° C., 1 to 5 hours), and finally applying a finish treatment such as grinding, scorching, painting and the like to the resulting integrally fixed product.

A brake pad for a disc brake, including the friction material, can be produced by the above steps.

Copper component such as fibers or particles of copper or copper alloy is added to a friction material in order to ensure fade resistance. However, in the friction material containing a copper component, the copper component is released into air as wear debris by braking. Therefore, the influence to natural environment is pointed out. In view of this, efforts are being made to restrict use of copper or the like in a brake pad for automobiles, and various copper-free friction materials are proposed. The friction material can be suitably used in a so-called copper-free and non-asbestos friction material having a content of copper, as an element, of 0.5% by mass or less. Furthermore, the friction material can be applied to low-steel and copper-free material.

EXAMPLES

The present invention is specifically described below by reference to examples, but the present invention should not be construed as being limited to the following examples.

Example 1

Preparation of LCNF Slurry 20 g of Japanese cedar wood flour (manufactured by Toyama West Forest Guild) having an average particle diameter ($D_{50}$) of 115 µm, 200 g of distilled water and zirconia balls having a diameter of 10 mm were placed in a zirconia pot. The resulting mixture was pulverized at 400 rpm for 6 hours using a planetary ball mill ("P-5" manufactured by Fritsch), thereby performing the defibration treatment.

After the defibration treatment, LCNF was recovered from the pot using 280 g of distilled water, and LCNF slurry having a solid content concentration of 4% by mass was obtained. The average fiber diameter of the LCNF was 100 nm.

Preparation of Phenol Resin Composition Having LCNF Dispersed Therein 180 g of phenol (manufactured by Wako Pure Chemical Industries, Ltd.), 109 g of a 37% formaldehyde solution (manufactured by Wako Pure Chemical Industries, Ltd.) and 0.4 g of oxalic acid (manufactured by Wako Pure Chemical Industries, Ltd.) were weighed and placed in a four-necked flask equipped with Dimroth condenser, a thermometer and a stirrer, followed by refluxing under heating at 100° C. for 6 hours.

After cooling to room temperature, 50 g (solid content: 2 g) of the LCNF slurry obtained above was placed in a flask, vacuum distillation was conducted under the pressure of −0.08 MPa while increasing the temperature to 180° C., and distilled water and unreacted phenol were distilled away. Thus, a phenol resin composition having LCNF dispersed therein was obtained.

After the preparation of the phenol resin composition having LCNF dispersed therein, 10% by mass of hexamethylene tetramine (manufactured by Wako Pure Chemical Industries, Ltd.) was added as a hardener to the composition obtained above.

The content of LCNF calculated from the yield of the phenol resin composition obtained was 1% by mass.

Example 2

LCNF slurry was prepared in the same manner as in Example 1.

Using 100 g (solid content: 4 g) of the LCNF slurry obtained, a phenol resin composition having LCNF dispersed therein was prepared in the same manner as in Example 1.

The content of LCNF calculated from the yield of the phenol resin composition obtained was 2% by mass.

Example 3

LCNF slurry was prepared in the same manner as in Example 1.

Using 250 g (solid content: 10 g) of the LCNF slurry obtained, a phenol resin composition having LCNF dispersed therein was prepared in the same manner as in Example 1.

The content of LCNF calculated from the yield of the phenol resin composition obtained was 5% by mass.

Example 4

LCNF slurry was prepared in the same manner as in Example 1.

Using 450 g (solid content: 18 g) of the LCNF slurry obtained, a phenol resin composition having LCNF dispersed therein was prepared in the same manner as in Example 1.

The content of LCNF calculated from the yield of the phenol resin composition obtained was 9% by mass.

Comparative Example 1

Straight phenol resin manufactured by Sumitomo Bakelite Co., Ltd. was used.

Test Example 1, Evaluation of Resin Property

Exothermic peak temperature and gelation time of the phenol resin compositions of Examples 1 to 4 and the phenol resin of Comparative Example 1 were measured.
(Exothermic Peak Temperature)

10 mg of each of the phenol resin compositions of Examples 1 to 4 and the phenol resin of Comparative Example 1 was weighed and placed in a measuring container, and the measurement was conducted from room temperature to 300° C. at a temperature rising rate of 5° C./min using a differential scanning calorimeter (DSC) ("Thermoplus EV02" manufactured by Rigaku Corporation). Exothermic peak originated from a thermosetting reaction of the resin was observed at a temperature of 100 to 250° C., and its peak temperature was read.

The results obtained are shown in Table 1 below.
(Gelation Time)

1 g of each of the phenol resin compositions of Examples 1 to 4 and the phenol resin of Comparative Example 1 was placed on a hot plate set to 150° C., and the time when the composition or resin was stirred by a dispersing spoon and did not become stringy was measured.

The results obtained are shown in Table 1 below.

TABLE 1

|  | Example | | | | Comparative Example |
|---|---|---|---|---|---|
|  | 1 | 2 | 3 | 4 | 1 |
| LCNF content (% by mass) | 1 | 2 | 5 | 9 | — |
| Exothermic peak Temperature (° C.) | 139 | 135 | 140 | 145 | 141 |
| Gelation time (sec) | 96 | 96 | 96 | 100 | 98 |

Test Example 2, Evaluation of Friction Material Property (Preparation of Friction Material)

A friction material was prepared in each formulation shown in Table 2 below using each of the phenol resin compositions of Examples 1 to 4 and the phenol resin of Comparative Example 1.

More specifically, all of blended materials shown in Table 2 were placed in a mixing stirrer, followed by mixing at room temperature for 5 minutes to obtain a friction material composition.

The friction material composition obtained was subjected to the following steps of (1) preforming, (2) thermoforming and (3) heating, thereby obtaining a brake pad including the friction material.
(1) Preforming The friction material composition was placed in a mold of a preforming press, followed by molding at room temperature under 20 MPa for 10 seconds to prepare a preform thereof.
(2) Thermoforming The preform was placed in a preforming mold, a metal plate (pressure plate; P/P) having previously applied thereto an adhesive was overlaid thereon, and the resulting assembly was formed under heating and pressuring at a temperature of 150° C. under a pressure of 50 MPa for 5 minutes.
(3) Heating The heated and pressurized formed product was heat-treated at a temperature of 250° C. for 3 hours, and then grinded.

Finish painting was conducted to obtain a brake pad including the friction material.

Bending test and friction performance test of the brake pad obtained were conducted.
(Bending Test)

A test piece having a size of 5 mm×10 mm×2 mm was cut out of the friction material, and bending strength (MPa) and bending elastic modulus (GPa) at room temperature and 300° C. of the test piece were measured according to JIS-K7171. The results obtained are shown in Table 2 below.
(Friction Performance Test)

Friction performance test was conducted using a brake dynamometer in accordance with JASO-C406.

Wear amount (mm) of the friction material after the friction performance test was measured. The results obtained are shown in Table 2 below.

TABLE 2

(Blending unit of friction material composition: % by mass)

|  | Example | | | | Comparative |
|---|---|---|---|---|---|
|  | 1 | 2 | 3 | 4 | Example 1 |
| LCNF-dispersed phenol resin composition (LCNF content: 1% by mass) | 10 | — | — | — | — |
| LCNF-dispersed phenol resin composition (LCNF content: 2% by mass) | — | 10 | — | — | — |
| LCNF-dispersed phenol resin composition (LCNF content: 5% by mass) | — | — | 10 | — | — |
| LCNF-dispersed phenol resin composition (LCNF content: 9% by mass) | — | — | — | 10 | — |
| Straight phenol resin | — | — | — | — | 10 |
| Aramid pulp | 5 | 5 | 5 | 5 | 5 |

TABLE 2-continued (Blending unit of friction material composition: % by mass)

|  |  |  | Example | | | | Comparative Example 1 |
|---|---|---|---|---|---|---|---|
|  |  |  | 1 | 2 | 3 | 4 |  |
| Potassium titanate | | | 25 | 25 | 25 | 25 | 25 |
| Barium sulfate | | | 35 | 35 | 35 | 35 | 35 |
| Graphite | | | 5 | 5 | 5 | 5 | 5 |
| Cashew dust | | | 5 | 5 | 5 | 5 | 5 |
| Zirconium silicate | | | 10 | 10 | 10 | 10 | 10 |
| Calcium hydroxide | | | 2 | 2 | 2 | 2 | 2 |
| Mica | | | 3 | 3 | 3 | 3 | 3 |
| | Total | | 100 | 100 | 100 | 100 | 100 |
| Bending test | Room Temperature | Strength (MPa) | 25 | 26 | 25 | 24 | 22 |
| | | Elastic modulus (GPa) | 9 | 10 | 9 | 8 | 7 |
| | 300° C. | Strength (MPa) | 21 | 21 | 16 | 16 | 11 |
| | | Elastic Modulus (GPa) | 6 | 6 | 6 | 5 | 3 |
| Friction Performance test | Wear amount of friction material (mm) | | 1.8 | 1.6 | 1.9 | 1.6 | 2.9 |

It was found from the results shown in Table 1 that the phenol resin compositions having LCNF dispersed therein in Examples 1 to 4 show thermosetting properties equivalent to those of the phenol resin in Comparative Example 1.

It was found from the results shown in Table 2 that the friction materials obtained using the phenol resin compositions having LCNF dispersed therein in Examples 1 to 4 have larger bending strength and bending elastic modulus and show smaller wear amount, as compared with those of the friction material obtained using the phenol resin in Comparative Example 1.

While the present invention has been described in detail and with reference to specific embodiments thereof, it will be apparent to one skilled in the art that various changes and modifications can be made therein without departing from the spirit and scope thereof.

The invention claimed is:

1. A thermosetting resin composition for a friction material, comprising a thermosetting resin and a lignocellulose nanofiber containing lignocellulose dispersed in the thermosetting resin, wherein the lignocellulose contains a cellulose, a hemicellulose, and a lignin.

2. The thermosetting resin composition according to claim 1, wherein a content of the lignocellulose nanofiber is 0.1 to 20% by mass.

3. The thermosetting resin composition according to claim 1, wherein the lignocellulose nanofibers has an average fiber diameter of 1 to 500 nm.

4. The thermosetting resin composition according to claim 1, wherein the thermosetting resin is a phenol resin.

5. The thermosetting resin composition according to claim 2, wherein the lignocellulose nanofibers has an average fiber diameter of 1 to 500 nm.

6. The thermosetting resin composition according to claim 5, wherein the thermosetting resin is a phenol resin.

7. The thermosetting resin composition according to claim 2, wherein the thermosetting resin is a phenol resin.

8. The thermosetting resin composition according to claim 3, wherein the thermosetting resin is a phenol resin.

9. The thermosetting resin composition according to claim 1, wherein the lignocellulose contains the cellulose in an amount of 45 to 50% by mass, the hemicellulose in an amount of 15 to 30% by mass, and the lignin in an amount of 25 to 35% by mass.

10. The thermosetting resin composition according to claim 1, wherein the lignocellulose has a three-dimensional network layered structure in which the cellulose is bonded to the lignin and the hemicellulose.

11. A friction material comprising the thermosetting resin composition according to claim 1.

12. The friction material according to claim 11, wherein a content of the thermosetting resin composition is 5 to 15% by mass.

13. A friction material comprising the thermosetting resin composition according to claim 6.

14. The friction material according to claim 13, wherein a content of the thermosetting resin composition is 5 to 15% by mass.

15. A friction material comprising the thermosetting resin composition according to claim 5.

16. The friction material according to claim 15, wherein a content of the thermosetting resin composition is 5 to 15% by mass.

17. A friction material comprising the thermosetting resin composition according to claim 2.

18. The friction material according to claim 17, wherein a content of the thermosetting resin composition is 5 to 15% by mass.

19. A friction material comprising the thermosetting resin composition according to claim 3.

20. The friction material according to claim 19, wherein a content of the thermosetting resin composition is 5 to 15% by mass.

21. A friction material comprising the thermosetting resin composition according to claim 4.

22. A method for producing the thermosetting resin composition for a friction material according to claim 1, comprising:
mixing a plant-based biomass containing a lignocellulose with a dispersion medium to obtain a mixture thereof, and subjecting the mixture to a defibration treatment, thereby obtaining a slurry of the lignocellulose nanofiber; and
reacting phenol with an aldehyde in the presence of an acid catalyst to obtain the thermosetting resin, adding the slurry to the thermosetting resin, and dispersing the lignocellulose nanofiber in the thermosetting resin while removing the dispersion medium and unreacted phenol.

* * * * *